C. E. DOUGLAS.
MEANS FOR SECURING FLOATS TO THEIR MOUNTING RODS.
APPLICATION FILED NOV. 30, 1915.
1,214,020.
Patented Jan. 30, 1917.
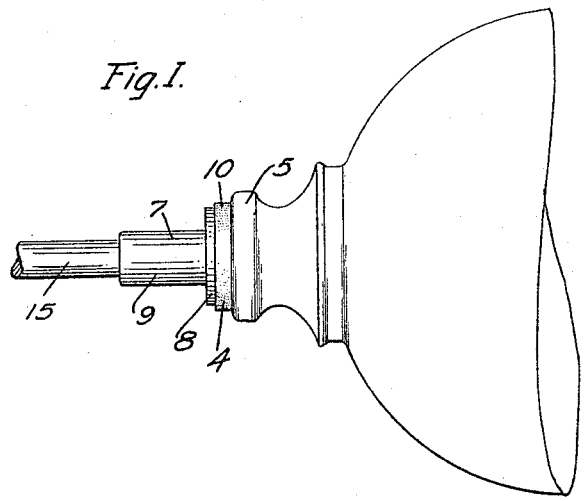
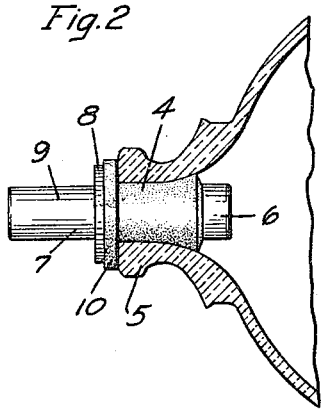
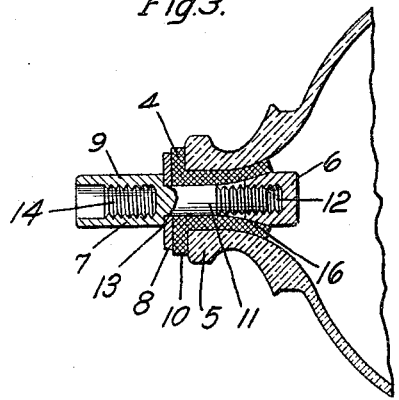
Witnesses:
Inventor—
Charles E. Douglas
By
Walter F. Murray
Attorney.

UNITED STATES PATENT OFFICE.

CHARLES E. DOUGLAS, OF CINCINNATI, OHIO, ASSIGNOR TO THE JOHN DOUGLAS COMPANY, OF CINCINNATI, OHIO, A CORPORATION OF OHIO.

MEANS FOR SECURING FLOATS TO THEIR MOUNTING-RODS.

1,214,020.  Specification of Letters Patent.  Patented Jan. 30, 1917.

Application filed November 30, 1915. Serial No. 64,275.

*To all whom it may concern:*

Be it known that I, CHARLES E. DOUGLAS, a citizen of the United States of America, and resident of Cincinnati, county of Hamilton, State of Ohio, have invented certain new and useful Improvements in Means for Securing Floats to Their Mounting-Rods, of which the following is a specification.

This invention relates to improvements in means for securing floats for flush tanks to their valve operating mounting rods and particularly to means for securing glass and earthenware floats to their mounting rods.

An object of my invention is to produce a means which will permit a glass or earthenware float to be attached to its valve operating mounting rod without danger of breaking the float by clamping it too tightly or by permitting any of the metal portions of the securing means coming into contact with the float.

A further object is to produce a means for attaching floats to their valve operating mounting rods in a manner such that they will be hermetically sealed.

A further object is to produce a means for attaching floats to their mounting rods in a manner to permit of the relative expansion and contraction of the material of the float and its securing means without subjecting the float to unequal expansion or contraction strains.

Figure 1 is a fragmental view of an end of a float having securing means embodying my invention attached thereto. Fig. 2 is a view similar to Fig. 1, but showing the float in section to disclose in elevation the securing means. Fig. 3 is a view similar to Fig. 2 but showing both the float and securing means in section.

In securing glass or earthenware floats to their valve operating mounting rods, the practice heretofore has been to grip the float with fingers extending beyond the greatest diameter thereof, by means of encircling bands, and by other means having rigid connection with the float. The objection to such means has been that expansion and contraction of the material of the float relatively to the expansion and contraction of the material of the securing means has not been possible without rendering the float liable to become cracked or otherwise broken from such a cause. In addition to this certain securing means have been such as to necessitate a great amount of care in properly securing them to the float, thus rendering such a means highly objectionable when floats have to be renewed at the place where they were to be used. These objections have been overcome by my means which is located within the neck 5 of the float, an expansion nut 6 adapted to enter the inner end of the collar 4, a bolt 7 adapted to draw the expansion nut into intimate engagement with the collar, and a washer 8 located between the enlarged head 9 of the bolt and an annular flange 10 formed on the collar. The collar is formed tubularly and is adapted to be forced within the neck of the float until the annular flange 10 has been brought into engagement with the end of the neck. The bolt 7 is provided with an external screw threaded extension 11 adapted to pass through the opening in the collar and to enter the internally screw threaded bore 12 in the expansion nut 6. Upon the extension 11 is mounted the washer 8 which engages the outer surface of the annular flange 10 of the rubber collar 4, and is in turn engaged by the annular shoulder 13 of the enlarged head 9 of the bolt. By gripping the head of the bolt by means of pliers or a suitable wrench, the screw threads of extension 11 and nut 6 draw the tapered end of the nut into the end of the collar and expand it against the diverging inner walls of the float. The enlarged head 9 is provided with an internally screw threaded bore 14 adapted to receive the screw threaded end of the valve actuating float stem 15 secured to the flush valve.

In mounting a float upon its stem by means of my invention the extension 11 of the bolt 7 is passed through the collar 4 and its screw threaded end is slightly engaged by the end of the nut 6 then the parts are passed through the opening of the neck of the float. By turning the bolt the nut 6 is drawn into the collar and expands it against the inner walls of the float.

I have found that by means of a rubber washer the bolt cannot be turned to too great an extent since the tension exerted by the tapered surface 16 against the rubber collar cannot become greater than the friction exerted between the surface of the collar and the float. For this reason the collar will be rotated in the float when the tension has become such as to overcome the friction between the float and the collar. This prevents fracture of the float and is especially desirable when the float is of glass, since it overcomes the danger of tightening the securing means to too great an extent.

Although I have described my improved securing means as having a rubber collar for separating the materials of the float and the metal elements of the securing means, collars of other material may be employed, such as fiber, composition and the like. It is essential that the material of which the collar is made, be such that the coefficient of friction between it and the material of the glass is not greater than the clamping force produced by the expansion nut 6 in coöperation with the bolt 7. I have found that rubber is the most desirable material to accomplish this. Furthermore it is essential that the material of which the collar is constructed be such as to permit of the relative expansion of the materials of the float and securing means and at the same time to permit of a certain degree of movement between the two to avoid breaking floats of such fragile material as glass or earthenware. By fastening the float to its securing means in this manner the body of the float is free to expand and contract as it is subjected to variations of temperature of liquid flowing from and into the tank in which the float is located, without being restrained by encircling bands or fingers.

Having thus described my invention, what I claim is;

1. In a means for securing a vitreous or ceramic float having a necked opening to a valve actuating rod, the combination of a yielding collar located within the opening of the neck and having an annular flange adapted to engage the end of the neck, an expansion device located at the inner end of the collar, and means secured to the valve rod, engaging the annular flange, passing through the collar, and operatively connected with the device, whereby the device may be caused to expand the collar within the float and press the flange against the end of the float.

2. In combination in a means for securing a vitreous or ceramic float having a necked opening to a valve actuating rod, a yielding collar located within the opening of the neck and having an annular flange engaging the exterior of the neck, an expansion nut located at the inner end of the collar, a washer located at the outer end of the collar and in engagement with the flange, and a headed bolt connected with the valve rod, passing through the collar and into the nut with the head of the bolt engaging the washer, whereby the nut will be caused to expand the collar and the washer to compress the flange to secure the float in position.

3. A means for securing a vitreous or ceramic float having a necked opening to a valve actuating rod, comprising a yielding collar located within the opening to the neck and having a flange engaging the end of the neck, an internally threaded expansion nut located at the inner end of the collar and having a conical surface adapted to engage and enter the collar, a washer located at the outer end of the collar and in engagement with the flange, and a headed screw threaded bolt connected with the valve rod, passing through the collar and into a nut, with the head of the bolt engaging the washer, whereby the nut will be drawn into the collar to expand it when the bolt is rotated, said collar having a coefficient of friction with relation to the material of the float, less than the force exerted by the screw threads, whereby the collar will rotate with relation to the float when the screw threads have brought the expansion nut into proper position with relation to the collar to hermetically seal the float.

In testimony whereof, I have hereunto subscribed my name this 26th day of November, 1915.

CHARLES E. DOUGLAS.

Witnesses:
WALTER F. MURRAY,
W. THORNTON BOGERT.

Copies of this patent may be obtained for five cents each, by addressing the "Commissioner of Patents, Washington, D. C."